(12) United States Patent
Mosinski et al.

(10) Patent No.: US 8,557,903 B2
(45) Date of Patent: Oct. 15, 2013

(54) OIL EXTENDED RUBBER COMPOSITIONS

(75) Inventors: Holger Mosinski, Bad Lauchstaedt (DE); Hans Edel, Erdeborn (DE); Hagen Bartossek, Schkopau (DE)

(73) Assignee: Styron Europe GmbH, Horgen (CH)

( * ) Notice: Subject to any disclaimer, the term of this patent is extended or adjusted under 35 U.S.C. 154(b) by 396 days.

(21) Appl. No.: 12/808,500

(22) PCT Filed: Dec. 12, 2008

(86) PCT No.: PCT/US2008/086615
§ 371 (c)(1),
(2), (4) Date: Jun. 16, 2010

(87) PCT Pub. No.: WO2010/068219
PCT Pub. Date: Jun. 17, 2010

(65) Prior Publication Data
US 2011/0123746 A1     May 26, 2011

Related U.S. Application Data

(60) Provisional application No. 61/015,765, filed on Dec. 21, 2007.

(51) Int. Cl.
| | |
|---|---|
| *C08K 5/06* | (2006.01) |
| *C08K 3/22* | (2006.01) |
| *C08K 3/36* | (2006.01) |
| *C08L 9/06* | (2006.01) |
| *C07C 43/18* | (2006.01) |
| *C08C 19/25* | (2006.01) |

(52) U.S. Cl.
USPC ........... 524/367; 524/418; 524/432; 524/451; 524/525; 524/526; 525/105; 525/236; 525/237; 564/606; 564/664

(58) Field of Classification Search
USPC ......... 524/367, 418, 432, 451, 502, 525, 526; 525/105, 332.5, 332.6, 236, 237; 568/606, 664
See application file for complete search history.

(56) References Cited

U.S. PATENT DOCUMENTS

| | | | |
|---|---|---|---|
| 3,262,902 A | 7/1966 | Robinson | |
| 3,285,804 A * | 11/1966 | Robinson | .............. 428/494 |
| 3,431,227 A * | 3/1969 | Kastning Ernst-Guenther et al. | ................. 526/320 |
| 3,766,137 A | 10/1973 | Watson | |
| 4,111,867 A | 9/1978 | Komuro et al. | |
| 4,341,672 A | 7/1982 | Hsieh et al. | |
| 6,201,070 B1 | 3/2001 | Kumabe et al. | |
| 2002/0198296 A1 | 12/2002 | Rawlinson et al. | |
| 2008/0156404 A1 | 7/2008 | Brunelet et al. | |

FOREIGN PATENT DOCUMENTS

| | | |
|---|---|---|
| EP | 1188789 A1 | 3/2002 |
| KR | 10-2006-0134978 | 12/2006 |
| RU | 2235105 C2 | 8/2004 |
| RU | 2266917 C2 | 12/2005 |

OTHER PUBLICATIONS

Yahiaoui et al. "Synthesis and structural analysis of poly(1,2-cyclohexene oxide) over solid acid catalyst"; Materials Letters 59 (2005) 759-767.*
PCT Search Report for corresponding PCT Application No. PCT/US2008/086615, mailed Feb. 6, 2009, 4 pgs.
Decision on Grant, Russian Patent Application No. 2010130455/05(043215), dated Apr. 26, 2013, p. 1-16, Patent Office of the Russian Federation, Russia.
Notification of the First Office Action, Chinese Patent Application No. 200880127192.5, dated Nov. 12, 2012, p. 1-14, State Intellectual Property Office of the People's Republic of China, China.
Official Action, Russian Patent Application No. 2010130455/05(043215), dated Nov. 13, 2012, p. 1-13, Patent Office of the Russian Federation, Russia.

* cited by examiner

*Primary Examiner* — Fred M Teskin
(74) *Attorney, Agent, or Firm* — Brinks Hofer Gilson & Lione

(57) ABSTRACT

The present invention describes a composition comprising a diene-based rubber and at least one cyclo-aliphatic epoxide-based polyether or polyglycol ether. The present invention also describes a composition comprising at least one extending oil and at least one cyclo-aliphatic epoxide-based polyether or polyglycol ether, wherein the at least one extending oil is selected from the group consisting of an aromatic oil, an aliphatic oil, a naphthenic oil, and mixtures thereof.

29 Claims, 2 Drawing Sheets

OIL EXTENDED RUBBER COMPOSITIONS

The present application is a U.S. National Phase of International Application No. PCT/US2008/086615, filed on Dec. 21, 2008 and which claims priority to U.S. Provisional Application No. 61/015,765, filed on Dec. 21, 2007; the disclosures of each are incorporated herein by reference.

FIELD OF THE INVENTION

The present invention relates to rubber compositions. Specifically, the present invention relates to rubber compositions containing diene based rubbers and cycloaliphatic epoxide-based polyether or polyglycol ether additives.

BACKGROUND OF THE INVENTION

Natural rubber based polymers are used for the manufacture of tires, electric insulations, elastic bands and belts, automotive components, containers and the like. However, the rising cost of natural rubber-based polymers have driven the search for rubber compositions that can replace all, or a portion of, natural rubber in polymeric formulations. A variety of polymers can be mixed to get desirable rubber compositions. These polymers are made by polymerizing one or more monomers such as, but not limited to, isoprenes, 1,3-butadienes, chloroprenes, and isobutylenes with a small percentage of isoprene for cross-linking Further, these and other monomers can be reacted in various desirable proportions to be copolymerized to obtain a wide range of physical, mechanical, and chemical properties.

Rubber compositions are increasingly being used as sealants, anti-static mats, abrasion resistant fillings, etc. Most rubbers comprise a polymer matrix and at least one additive. Additives help improve the properties of rubber compositions. Rubber compositions containing a number of additives are used for purposes, including, but not limited to, improving the processability of the rubber, enhancing tread life, improving stoppage properties, and reducing the degradation of rubber. Examples of additives include, but are not limited to, tackifiers, waxes, colorants, and antioxidants.

SUMMARY OF THE INVENTION

In one embodiment, the present invention is a composition comprising a diene-based rubber and at least one cyclo-aliphatic epoxide-based polyether or polyglycol ether. In an embodiment, the diene-based rubber is a butadiene-based polymer. In another embodiment, the composition further comprises at least one rubber, where the rubber is a natural rubber, a butadiene-based rubber, an ethylene-propylene-diene monomer rubber, and an isoprene based rubber.

In another embodiment, the composition comprises a filler, where the filler is carbon black, talc, silica, sulfur, zinc oxide, and mixtures thereof. In another embodiment, the composition comprises a curing agent where the curing agent is sulfur, a mercaptan, a silane coupler, and mixtures thereof. In such embodiments, the curing agent further comprises an accelerant.

In one embodiment of the composition, the at least one cyclo-aliphatic epoxide-based polyether or polyglycol ether is comprised of a reaction product between at least one cyclo-aliphatic epoxide and at least one reactant. In such embodiments, the cyclo-aliphatic epoxide may have 4-12 carbon atoms. In other such embodiments, the cyclo-aliphatic epoxide is selected from the group consisting of cyclobutene oxide, cyclopentene oxide, cyclohexene oxide, cycloheptene oxide, cyclooctene oxide, cyclododecene oxide, 1,2,5,6-diepoxycyclooctane, alkyl-substituted derivatives thereof, and mixtures thereof. In such other embodiments, the reactant is a compound with at least one hydroxyl functional group.

In some embodiments, the composition further comprises at least one extending oil of aromatic oil, an aliphatic oil, a naphthenic oil, and mixtures thereof.

In some embodiments, the composition has a Mooney viscosity (ML1+4 at 100° C.) of about 40 to about 70 Mooney units.

In some embodiments, the diene-based rubber has a styrene content in the range of about 20 to about 40 weight percentage of said diene-based rubber.

In some embodiments, the composition is cured. In some such embodiments, the cured composition has a percentage of cross-linking in a range of about 50 to about 100 percent.

In some embodiments for producing the compositions, a step of incorporating at least one of the cyclo-aliphatic epoxide-based polyether or polyglycol ether into the diene-based rubber is made. In some such embodiments, the step of incorporating may occur through an emulsion-based polymerization process, a solution-based polymerization process, or a blending process.

In some embodiments, a composition comprises a diene-based rubber and at least one extending oil, wherein the extender oil further comprises at least one cyclo-aliphatic epoxide-based polyether or polyglycol ether. In such embodiments, some embodiments have the at least one extending oil is in the range of about 0.1 to 50 percent by weight of the composition. In such embodiments, the at least one extending oil may be selected from the group consisting of an aromatic oil, an aliphatic oil, a naphthenic oil, and mixtures thereof. In such embodiments, the least one cyclo-aliphatic epoxide-based polyether or polyglycol ether content of the extending oil may be in a range of about 0.1 to about 99 percent by weight of the at least one extending oil.

In some embodiments, an article comprised of the composition is claimed. In such embodiments, the article may be selected from the group comprising tires, hoses, industrial rubber goods, and shoe soles. In some other embodiments, the article has a tan delta, measured at 0.2 rad/s and at a temperature of from about 0 to about 2° C., in the range of about 0.2 to about 0.4. In other such embodiments, the article has a tan delta, measured at 0.2 rad/s and at a temperature of from about 60° C., in the range of about 0.08 to about 0.1.

In some embodiments, a composition comprises at least one extending oil and at least one cyclo-aliphatic epoxide-based polyether or polyglycol ether, wherein the at least one extending oil is selected from the group consisting of an aromatic oil, an aliphatic oil, a naphthenic oil, and mixtures thereof. In such embodiments, the at least one cyclo-aliphatic epoxide-based polyether or polyglycol ether content may be in a range of about 0.1 to about 99 percent by weight of the composition. In such embodiments, the at least one extending oil is a treated distillate aromatic extract.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated embodiments of the invention.

It should be understood that any one of the features of the invention may be used separately or in combination with other features. It should be understood that features which have not been mentioned herein may be used in combination with one or more of the features mentioned herein. Other systems, methods, features, and advantages of the illustrated embodiments of the invention will be or become apparent to one with skill in the art upon examination of the drawings and detailed description. It is intended that all such additional systems, methods, features, and advantages be included within this description, be within the scope of the present invention, and be protected by the accompanying claims.

These and other objects, features and advantages of the invention will be more readily apparent when considered in connection with the following, detailed description of preferred embodiments of the invention, which description is presented in conjunction with annexed drawings.

BRIEF DESCRIPTION OF THE DRAWINGS

The foregoing summary as well as the following detailed description of the illustrative embodiments of the invention will be better understood when read in conjunction with the appended drawings. It should be understood, however, that the invention is not limited to the precise arrangements and instrumentalities shown. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE ILLUSTRATIVE EMBODIMENTS

Figure 1:
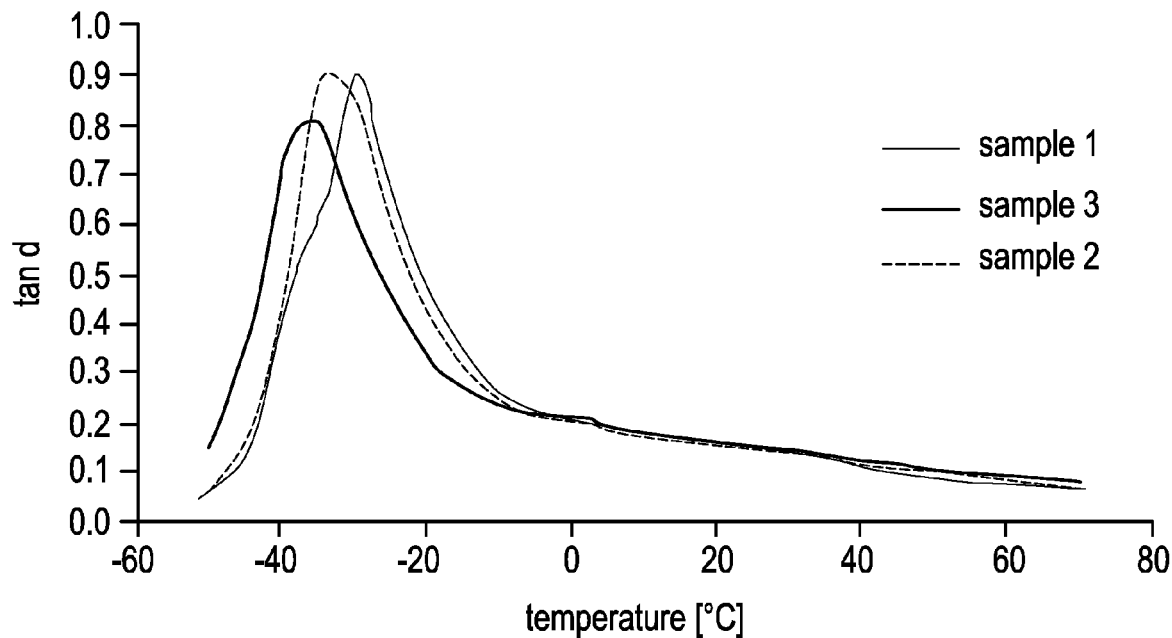
FIG. 1 is a plot depicting tan d responses from −50° C. to 70° C. for Examples 5 and 6 in comparison to Comparative Example 1.

The following discussion is presented to enable a person skilled in the art to make and use the invention. The general principles described may be applied to embodiments and applications other than those detailed below without departing from the spirit and scope of the present invention as defined by the appended claims. The present invention is not intended to be limited to the embodiments shown, but is to be accorded the widest scope consistent with the principles and features disclosed.

Rubber is an elastic hydrocarbon produced naturally as well as synthetically. Natural rubber is a hydrocarbon polymer of isoprene that is a milky colloidal suspension obtained from a variety of plants. Diene-based rubber is made by the polymerization of a variety of monomers, including, but are not limited to, isoprene, 1,3-butadiene, isobutylene, and chloroprene.

In their crude state, natural and diene-based rubbers possess certain physical properties that must be modified to obtain useful end products. The unmodified forms of rubber are soft and tacit; however, without further processing the crude rubber may lose their elasticity with use, have their physical properties change markedly with temperature, and eventually degrade with exposure to air and sunlight. Both forms of rubber are processed through compounding and curing to preserve their properties.

The final properties of processed rubbers can be improved by including additives during the compounding and curing processes. Examples of rubber additives include antioxidants, tackifiers, and antidegradants.

The Rubber Composition

In some embodiments, a composition comprising a diene-based rubber and at least one cyclo-aliphatic epoxide-based polyether or polyglycol ether is formed. The term "diene-based rubber" as used refers to any type of artificially made polymer material which acts as an elastomer. The term "cyclo-aliphatic epoxide-based polyether or polyglycol ether" as used refers to a polyether or polyglycol ether composition that is derived from a cycloalkene oxide having 4-12 carbon atoms.

In some embodiments, the composition further comprises at least one rubber selected from the group consisting of a natural rubber, a butadiene-based rubber, an ethylene propylene diene monomer (EPDM) rubber, and an isoprene based rubber. Examples of butadiene based rubber include, but are not limited to, polybutadiene rubber (BR), and styrene-butadiene rubber (SBR). Examples of isoprene based rubber include, but are not limited to, polyisoprene rubber (IR), isobutylene-isoprene rubber, and styrene-isoprene-styrene rubber (SIS).

In some embodiments, the composition further comprises a filler. In some embodiments, the composition further comprises a curing agent. In some embodiments, the composition further comprises a UV inhibitor. In some embodiments, the composition is cured.

In some embodiments, the composition further comprises at least one extending oil selected from the group comprising an aromatic oil, an aliphatic oil, a naphthenic oil, and mixtures thereof. Examples of aromatic oils and aliphatic oils include, but are not limited to, treated distillate aromatic extract (TDAE) oil, mild extracted solvent (MES), distilled aromatic extract (DAE), mineral oils, petroleum oils, hydrogenated naphthenic base oils, and non polar solvents. In such embodiments, the TDAE oil may be VIVATEC 500 oil (British Petroleum Chemicals).

In some embodiments, the extended composition has a Mooney viscosity of about 40 to about 70 Mooney units, measured at $ML_{1+4}$ at 100° C. The term "Mooney viscosity" as used refers to the shearing torque resisting rotation of a cylindrical metal disk (or rotor) embedded in rubber within a cylindrical cavity. Mooney viscosity is measured using ASTM D1646 with MV 2000E equipment.

Diene-Based Rubber

Diene-based rubber is any type of artificially made polymer material which acts as an elastomer. Diene-based rubber serves as a substitute for natural rubber in many cases, especially when improved material properties are needed. Diene-based rubber is made by the polymerization of a variety of monomers. Examples of monomers include, but are not limited to, isoprene, 1,3-butadiene, isobutylene, and chloroprene.

In some embodiments, the diene-based rubber may also be a styrene-based rubber. Styrene-based rubbers are known in the art as high-performance elastomers. In some embodiments, the styrene-based rubbers are made by anionic polymerization of styrene using catalysts such as, but not limited to, group IA metals and their alkyls, amides, silanolates, naphthalides, biphenyls, and anthracenyl derivatives. Examples of styrene based rubber include, but are not limited to, styrene-butadiene rubber (SBR), styrene-butadiene-styrene rubber (SBS), styrene-ethylene-butylene-styrene rubber (SEBS), styrene-butylene-styrene rubber (SES), and styrene-isoprene-styrene rubber (SIS).

In some embodiments, the diene based rubber has a styrene content of about 20 to about 40 weight percent.

SBR is one of the most important diene based rubbers and one of the most widely used. SBRs are obtained by the emulsion polymerization of butadiene and styrene in varying ratios. In some embodiments, ratio of butadiene to styrene is about 76.5:23.5. SBRs do not crystallize upon stretching and therefore have low tensile strength unless they are further reinforced. In an embodiment of the present invention, SBR is used in tires and tire products. Other uses include, but are not limited to, manufacturing of belt, hose, wire and cable coatings, flooring, shoe products, sponge, insulation, and molded goods.

In some embodiments, the SBR may be an emulsion styrene butadiene rubber (ESBR). In some embodiments, the ESBR may be made by free radical emulsion copolymerization of styrene and butadiene monomers. The free radical emulsion copolymerization involves combining styrene and butadiene monomers in water, with an initiator system, an emulsifier system, and molecular weight modifiers.

In other embodiments, the SBR may be a solution styrene butadiene rubber (SSBR). In such embodiments, the SSBR may be made by anionic polymerization of styrene and butadiene monomers. SSBRs are often used for the manufacture of high quality technical rubber goods.

In some embodiments, the diene-based rubber may further comprise natural rubber, butadiene based rubber, ethylene propylene diene monomer rubber (EPDM), or isoprene based rubber.

In some embodiments, the diene-based rubber (SBR) present in the composition is in a range from about 0.1 to about 99 weight percent of the final composition. In some embodiments, the diene based rubber is in a range from about 1 to about 95 percent by weight of the final composition. In some embodiments, the diene based rubber is in a range from about 5 to about 90 percent by weight of the final composition.

Cyclo-Aliphatic Epoxide-Based Polyether or Polyglycol Ether

Examples of cyclo-aliphatic epoxides having 4-12 carbon atoms that are useful for preparing cyclo-aliphatic epoxide-based polyethers or polyglycol ethers for diene-based rubber compositions include but are not limited to, cyclobutene oxide, cyclopentene oxide, cyclohexene oxide, cycloheptene oxide, cyclooctene oxide, cyclododecene oxide, 1,2,5,6-diepoxycyclooctane, their alkyl substituted derivatives, and mixtures thereof.

Examples of reactants for derivatizing cyclo-aliphatic epoxides for use in diene-based rubber compositions are compounds having n number of active hydroxyl groups, include but not limited to, water, primary, secondary and tertiary alcohols, aliphatic and cycloaliphatic mono-, di- and tri-carboxylic acids as well as anhydrides having from 1 to 20 carbon atoms, cycloalkyl alcohols having from 4 to 10 carbon atoms, glycols and polyols, and mixtures thereof.

In some embodiments, cyclo-aliphatic epoxide-based polyether or polyglycol ether is comprised of a reaction product of a cyclohexene oxide. In such embodiments, the cyclohexene oxide derivative is CHO-PG 59. The term "CHO-PG 59" as used refers to a cyclohexene oxide-derived (poly) glycol ether prepared by reacting ethylene glycol with cyclohexene oxide. In another embodiment, the cyclohexene oxide derivative is CHO-PG 200. The term "CHO-PG 200" as used refers to cyclohexene oxide-derived polyether prepared from a reaction between butanol and cyclohexene oxide.

The following are several structures (I-V) for some of the embodiment at least one cyclo-aliphatic epoxide-based polyether or polyglycol ether derivatives:

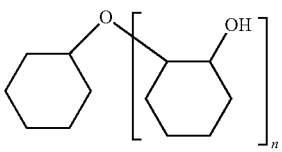

Empirical structure of a CHO-polyether

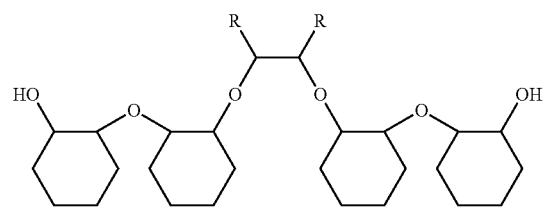

Empirical structure of CHO-PG 59

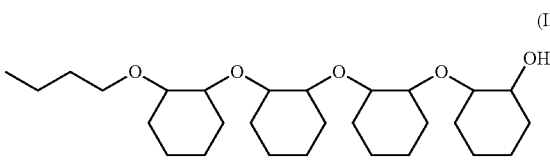

Empirical structure of CHO-PG 200

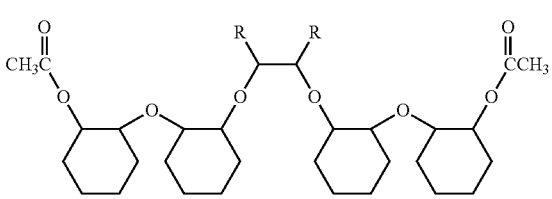

Empirical structure of an acetic acid capped CHO-polyglycol ether

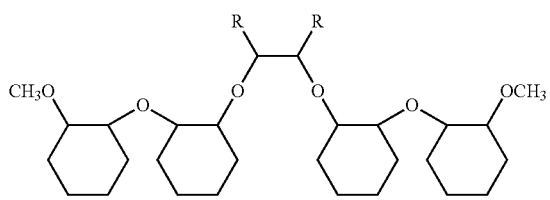

Empirical structure of a methyl terminated CHO-polyglycol ether.

In an embodiment, the cyclo-aliphatic epoxide-based polyether or polyglycol ether may be dissolved in solvents such as aromatic oils, aliphatic oils, and naphthenic oils, before being incorporated in the diene-based rubber. In another embodiment, the polyether or polyglycol ether may be incorporated in the diene based rubber before, after or at the same time solvents such as, aromatic oils and aliphatic oils are being added. Examples of aromatic oils and aliphatic oils include, but are not limited to, the oils as previously described.

In some embodiments, the composition range of the cyclo-aliphatic epoxide-based polyether or polyglycol ether/extending oil blend is about 0.1 to about 50 weight percent of the final rubber composition. In some embodiments, the composition range of the cyclo-aliphatic epoxide-based polyether or polyglycol ether/extender oil blend is about 10 to about 45 weight percent of the final rubber composition. In some embodiments, the composition range of the cyclo-aliphatic epoxide-based polyether or polyglycol ether/extender oil blend is about 20 to about 35 weight percent of the final rubber composition.

In some embodiments, the composition range of the cyclo-aliphatic epoxide-based polyether or polyglycol ether within an extending oil composition is about 0.1 to about 99 percent by weight of the extending oil composition. In some embodiments, the composition range of the cyclo-aliphatic epoxide-based polyether or polyglycol ether within an extending oil composition is about 20 to about 80 percent by weight of the extending oil composition. In some embodiments, the composition range of the cyclo-aliphatic epoxide-based polyether or polyglycol ether within an extending oil composition is about 30 to about 65 percent by weight of the extending oil composition.

Fillers

Fillers are used in polymers to achieve, improved processing, control of thermal expansion, electrical properties, magnetic properties, and improved mechanical properties, and as a substitute for costly materials. Each filler type has different properties and these in turn are influenced by the particle size, shape and surface chemistry. Particle specific surface area and packing are important aspects.

In some embodiments, the composition comprises a filler component. Examples of the filler component include, but are not limited to, carbon black, talc, silica, zinc oxide, and clays. Fillers may be present in an amount of about 10 percent to about 50 percent by weight of the final composition.

Curing Agent

Curing agents are substances or mixtures of substances added to a rubber composition to promote or control the curing reaction.

In some embodiments, the composition comprises a curing agent. Examples of curing agents include, but are not limited to, sulfur, a mercaptan, and a silane coupler. In such embodiments, the mercaptan may be tertiary dodecylmercaptane.

In some embodiments, the curing agent comprises an accelerant. Accelerants are substances or mixtures of substances added to a rubber composition to speed up the curing process. In some embodiments, the accelerant may be a carbamate.

In some embodiments, the composition is partially cured. In other embodiments, the composition is fully cured. In such embodiments, the cured composition has a percentage of cross linking in a range of about 50 to about 100 percent.

UV Inhibitors

UV inhibitors are substances or mixtures of substances, added to a rubber composition to prevent fading, drying and cracking as a result of exposure to UV light.

In an embodiment of the present invention, the composition comprises UV inhibitors. The UV inhibitors may be carbon black, phenolic and phosphonic stabilizers.

Uses of Compositions

Embodiment rubber compositions have adequate processability properties such as heat resistance, heat stability, pressure stability, controllable viscosity, and the like. Additionally, embodiment rubber compositions have improved abrasion resistance, traction properties, and tear resistance, over those available compositions in the prior art.

The embodiment compositions may be used in a variety of articles including, but are not limited to, tires, hoses, industrial rubber goods, and shoe soles. In some embodiments, the articles have a tan delta value, measured at 0.2 rad/s and at a temperature of from about 0° C. to about 2° C., in a range of about 0.2 to about 0.4. In other embodiments, the articles have a tan delta value, measured at 0.2 rad/s and at a temperature of from about 60° C., in a range of about 0.008 to about 0.01.

Tires manufactured using the composition have properties such as enhanced tread life, enhanced safety, better stop property, quicker response, better grip, enhanced wet and dry traction, all-season high performance, and abrasion resistance.

EXAMPLES

The following Examples further illustrate several aspects of the invention. However, the invention is not limited by these Examples.

Creation of Cyclo-Aliphatic Oxide-Based Polyglycol Ethers

CHO-PG 59 is prepared from ethylene glycol and cyclohexene oxide. One mole of ethylene glycol is reacted with four moles of cyclohexene oxide to give CHO-PG 59, as given in Equation 1:

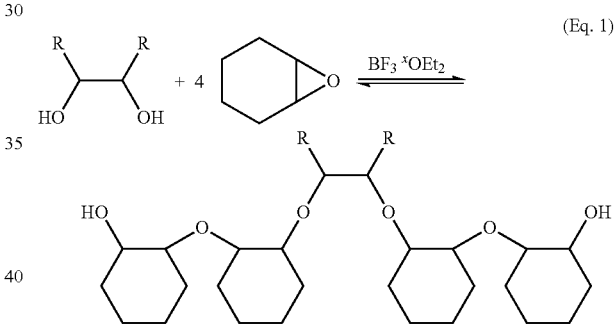

(Eq. 1)

Ethylene glycol (31.03 g) is mixed with cyclohexene oxide (196.29 g) in a 1 L, five-neck round bottom flask fitted with a stirrer, nitrogen purge, and heating/cooling control. The mixture is cooled to 15° C. One ml of boron trifluoride diethyl etherate (48%) ($BF_3.OEt_2$) is added of the reaction mixture in 0.1 cc increments during one hour to keep the temperature below 60° C. After addition, the reaction mixture is warmed to 80° C. over 30 minutes and then maintained for one hour while stirring. After that water (5 cc) is added to the mixture to quench the reaction. The mixture is then transferred to a 1 L round bottom flask and placed on the rotary evaporator. The water and volatile species are removed with heat (100° C.) and vacuum (10 in Hg). The yield obtained is 99.3% of CHO-PG 59.

Analysis of the reaction product is performed using a mass spectrometer SSQ 7000 from Finnigan (Thermo Scientific; Waltham, Mass.) coupled with a GC 5890 (Hewlett Packard; Palo Alto, Calif.). The average molecular weight of CHO-PG 59 is 457.74. The average mol CHO-units presented in CHO-PG 59 is 4.03. This indicates two cyclohexene oxide units were incorporated per hydroxyl group in the chain.

CHO-PG 200 is prepared from butanol and cyclohexene oxide. One mole of butanol reacts with four moles of cyclohexene oxide to give CHO-PG 200.

Butanol (37.06 g) is mixed with cyclohexene oxide (196.29 g) in a 1 L, five-neck round bottom flask fitted with a stirrer, nitrogen purge, and heating/cooling control. One ml of $BF_3.OEt_2$ is added to the reaction mixture in 0.1 cc increments at 50° C. during one hour while the temperature is kept below 60° C. After addition, the reaction mixture is warmed up to 60° C. and then maintained for one hour while stirring. After that, water (5 cc) is added to quench the reaction. The mixture is transferred to a one liter round bottom flask and placed on the rotary evaporator. The water and volatile species are removed with heat (100° C.) and vacuum (10 in Hg). 210.7 g of the reaction product are obtained, that means a yield of 90.3% of CHO-PG 200.

The obtained PG-ether, at room temperature, is clear, highly viscous and nearly colorless product. The average molecular weight of CHO-PG 200 is 405.64. The average mol CHO-units present in CHO-PG 200 is 3.38.

Extending Oil/Polyglycol Ether Mixtures

Blends of polyether additives and base extender oils were prepared in graduated glass beakers. The base stock extender oil was weighted into the beaker followed by the polyether additive in an amount to provide the desired final weight percent active. The mixture was heated and stirred to effect complete solubility.

TDAE 59-50 is created by blending the previously made CHO-PG 59 material with a TDAE oil in a 50:50 weight percent ratio. TDAE 200-50 is created by blending CHO-PG 200 with a TDAE oil in a 50:50 weight percent ratio. The TDAE oil used is VIVATEC 500 (British Petroleum Chemicals).

TDAE 59-50, TDAE 200-50, and the comparative TDAE are characterized by their glass transition temperature ($T_g$) via Differential Scanning Calorimetry (DSC) as shown in Table 1. The DSC analysis is done using a DSC 2920 instrument.

TABLE 1

Comparative properties of TDAE mixtures and TDAE standard.

| Oil/additive mixture | $Tg_i^E$ | Tg | $\Delta c_p$ |
|---|---|---|---|
| TDAE 59-50 | −36.2 | −28.7 | 0.49 |
| TDAE 200-50 | −46.8 | −40.3 | 0.43 |
| Straight VIVATEC 500 (comparative) | −53.6 | −48.2 | 0.36 |

Examples 1-6

Oil-Extended ESBR Compositions

Examples 1-6 are created by blending the two previously made oil mixtures and the TDAE standard with two different ESBR latexes. One of the ESBR latexes is SBR 1723. SBR 1723 is a non-extended rubber that has a raw Mooney viscosity of 100-130 Mooney units and a styrene content of about 23.5 weight percent. The other ESBR latex is SBR 1739. SBR 1739 is a non-extended rubber has a raw Mooney viscosity of 110-140 Mooney units and a styrene content of about 40 weight percent.

The combinations of "oil-extended ESBR compositions" are summarized in Table 2. The term "oil extended ESBR composition" as used refers to the mixture of an ESBR with a CHO-polyether/oil components. The polyether/oil mixtures comprise 27.3 weight percent of the final oil extended ESBR composition. Examples 3 and 6 represent oil extended ESBR standards (comprising 27.3% by weight standard oil) for comparison.

TABLE 2

Testing matrix for Examples 1-6

| | ESBR | |
|---|---|---|
| Oil Mixture | SBR 1723 Example ID# | SBR 1739 Example ID# |
| TDAE 59-50 | 1 | 4 |
| TDAE 200-50 | 2 | 5 |
| VIVATEC 500 | 3 | 6 |

After blending to the appropriate ratio of oil to ESBR, the samples are coagulated, separated, and dried according to techniques well understood in the art for rubber processing.

Examples 1-6

Raw Polymeric Characterization

The oil-extended ESRB compositions of Examples 1-6 are characterized by different methods, including styrene content determination, extract (ETA) value determination, and Mooney viscosity determination. Mooney viscosity is measured according to ASTM D 1646 procedure with a preheating time of 1 minute and a rotor operation time of 4 minutes at a temperature of 100° C. using a MV 2000E.

TABLE 3

Raw polymer characterization of Examples

| | | Example | | | | | |
|---|---|---|---|---|---|---|---|
| | Units | 1 | 2 | 3 | 4 | 5 | 6 |
| Styrene content | % | 23.8 | 23.3 | 23.6 | 40.5 | 40.5 | 39.8 |
| Extract (ETA) | % | 32.0 | 31.5 | 33.2 | 32.5 | 31.9 | 33.6 |
| ML 1 + 4 + 1 massed | MU | 50 | 50 | 49 | 54 | 53 | 54 |

The data in Table 3 reveals no significant difference in polymer characteristics of the raw Examples in comparison to each other and the standards. The Mooney viscosity for the compounds with the new oils is in a comparable range as the reference rubbers.

Examples 1-6

Compounding Properties

The oil-extended ESRB compositions are compounded based on ASTM D 3185 using carbon black IRB7. A lab mill is used to compound the Examples and form the resulting vulcanizates.

Measurement of the un-vulcanized rheological properties are performed according to ASTM D 5289 using a rotor-less shear rheometer (MDR 2000E) (Monsanto; St. Louis, Mo.) to measure Scorch Time (Ts) and Time to Cure (T). "T50" and "T90" are the times required to achieve 50% and 90% conversion of the vulcanization reaction, respectively. "Ts2" is the time required to increase the torque by 2 dNm above the respective torque minimum (ML) during vulcanization. MH is the torque maximum during vulcanization.

TABLE 4

Compounding properties of Examples

| | unit | Example 1 | 2 | 3 | 4 | 5 | 6 |
|---|---|---|---|---|---|---|---|
| Compound viscosity MDR 2000 | MU | 63.3 | 60.7 | 58.2 | 64.3 | 61.2 | 59.5 |
| Ts2 | min | 3.54 | 3.87 | 4.62 | 3.21 | 3.96 | 5.04 |
| T50 | min | 5.14 | 5.65 | 7.03 | 4.51 | 5.56 | 7.53 |
| T90 | min | 9.14 | 10.72 | 12.13 | 9.55 | 10.84 | 14 |
| ML | dNm | 2.37 | 2.35 | 2.32 | 2.28 | 2.22 | 2.28 |
| MH | dNm | 17.22 | 16.6 | 17.43 | 16.32 | 16.18 | 16.42 |

Table 4 illustrates that the CHO-PG-containing oil-extended ESRB composition Examples possess relatively increased compound viscosities as well as higher vulcanization speed as compared to their related standard Examples.

Examples 1-6

Vulcanizates Properties

Examples 1-6 were cured in a press cure at 145° C. for 35 minutes.

Tensile strength, elongation at break, and modulus at 300% elongation (Modulus 300) are measured according to ASTM D 412 on a Zwick Z010 (Ulm, Germany). DIN abrasion is measured according to DIN 53516 (1987-06-01).

TABLE 5

Vulcanizate properties of Examples

| | Units | Example 1 | 2 | 3 | 4 | 5 | 6 |
|---|---|---|---|---|---|---|---|
| Tensile strength | MPa | 23.6 | 24.7 | 24.4 | 24.9 | 23.7 | 24 |
| Elongation | % | 430 | 482 | 502 | 505 | 472 | 544 |
| Modulus 300 | MPa | 15.0 | 14.2 | 13.2 | 14.9 | 15.1 | 12.8 |
| Rebound resilience at 23° C. | % | 42.4 | 41.8 | 42 | 19 | 20.4 | 25.2 |
| Rebound resilience at 60° C. | % | 58.8 | 58.6 | 56 | 50.4 | 50.4 | 4.8 |
| Hardness Shore A | | 63.5 | 63.3 | 62.7 | 64.7 | 64.7 | 61.9 |
| DIN Abrasion (normalized) | | 101 | 113 | 100 | 128 | 105 | 100 |

Table 5 reveals improved lower elongations in combination with higher Modulus 300 for the CHO-PG-containing oil-extended ESRB composition Examples over the related standard Examples. Hardness Shore A is slightly increased for the vulcanizate CHO-PG-containing oil-extended ESRB composition Examples. The rebound resiliencies at 60° C. for Examples 1 and 2 and lower rebound resiliencies at 23° C. for the Examples 4 and 5 differ from their the related standard Examples 3 and 6, respectively.

Examples 1-6

Dynamic Mechanical Analysis

Rolling resistance is the resistance that occurs when an object (e.g., a wheel or tire) rolls. The rolling resistance is represented by the hysteresis loss based on the deformation that a tire makes during one revolution. The frequencies based on tire revolution are in the range of 10 to 100 Hz that is equivalent of tan delta at 30° C. to 70° C. as converted in temperature. Tan delta at 60° C. is commonly used for prediction of rolling resistance.

The term 'tan delta' as used refers to the ratio of loss modulus to storage modulus. Tan delta is measured using the dynamic spectrometer Eplexor 150N manufactured by (Gabo Qualimeter Testanlagen GmbH; Ahlden, Germany) by applying a compression dynamic strain of 0.2% while inducing a frequency of 2 Hz at 60° C. For tan delta (60° C.), the smaller the index, the lower is the rolling resistance. Tan delta (0° C.) is measured using the same equipment and load conditions at 0° C. The larger the index, the better the wet skid resistance.

TABLE 6

Dynamic mechanical values of Examples

| | Unit | Example 1 | 2 | 3 | 4 | 5 | 6 |
|---|---|---|---|---|---|---|---|
| tan d max | ° C. | −30 | −28 | −35 | −12 | −15 | −20 |

Figure 2:
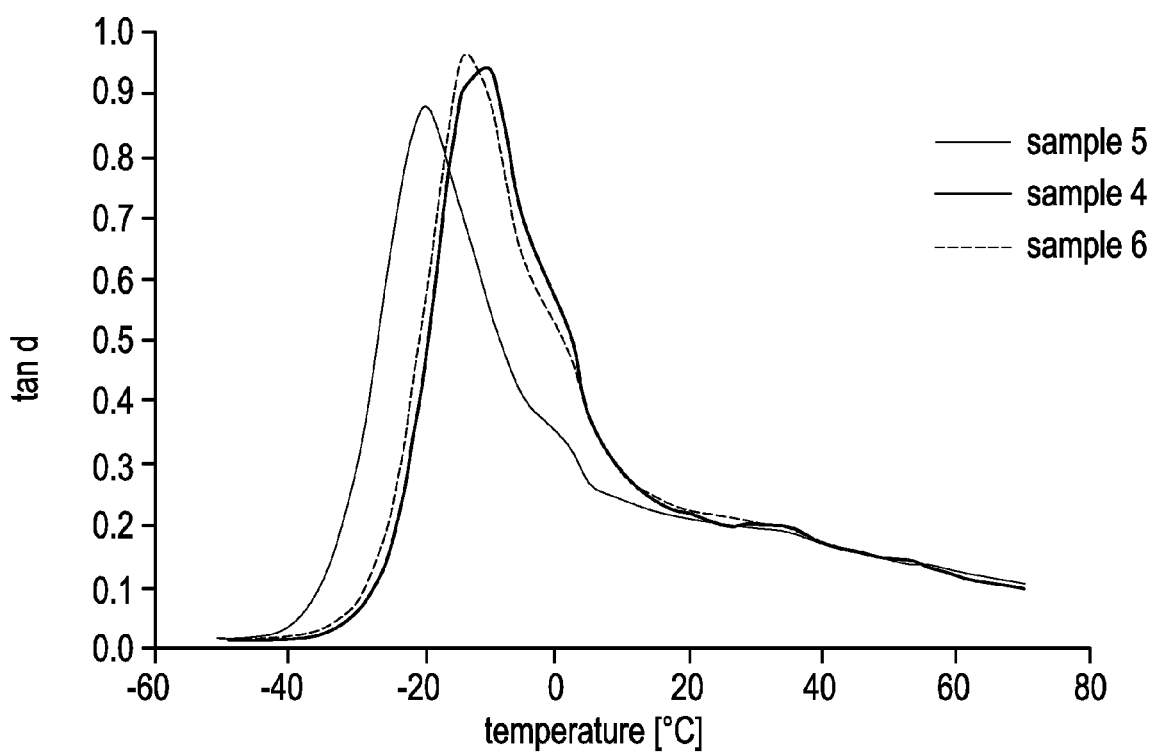
FIG. 2 is a plot depicting tan d responses from −50° C. to 70° C. for Examples 7 and 8 in comparison to Comparative Example 2.

FIGS. 1-4 are plots indicating the properties of rolling resistance and grip given different temperature conditions. FIG. 1 is a plot depicting tan delta responses from −50° C. to 70° C. for Examples 1 and 2 (called Samples 1 and 2) in comparison to Example 3 (called Sample 3). FIG. 2 is a plot depicting tan delta responses from −50° C. to 70° C. for Examples 4 and 5 (called Samples 4 and 5) in comparison to Example 6 (called Sample 6). The responses shown in FIGS. 1 and 2 reveal that tan d maximum are not only higher in value but also shifted towards to higher temperatures.

Figure 3:
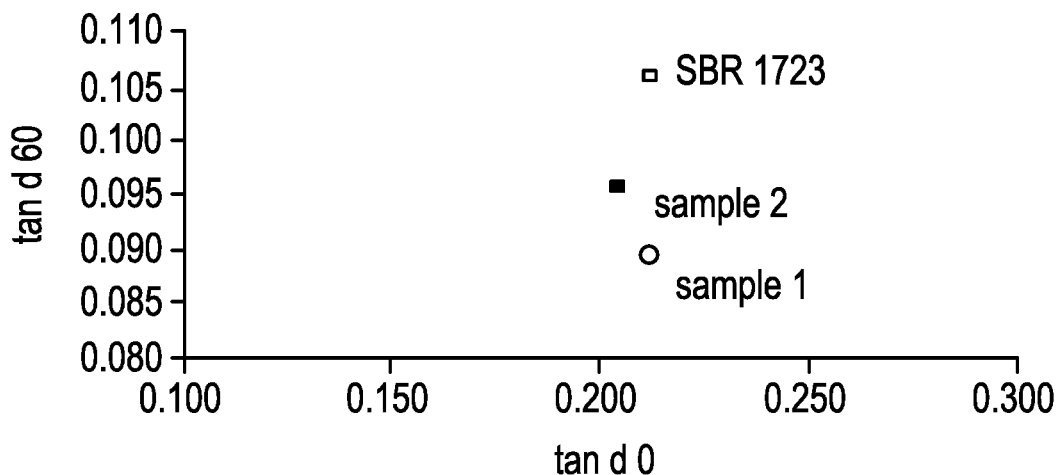
FIG. 3 is a plot depicting tan d 0 vs. tan d 60 of Examples 5 and 6 in comparison to Comparative Example 1.

FIG. 3 is a plot depicting tan delta 0 vs. tan delta 60 of Examples 1 and 2 (again called Sample 1 and 2) in comparison to Example 3 (called SBR 1723). Examples 1 and 2 show a reduce of tan d 60° C. at similar levels of tan d 0° C. up to 15%. This result is indicative of a lower of rolling resistance for the compositions.

Figure 4:
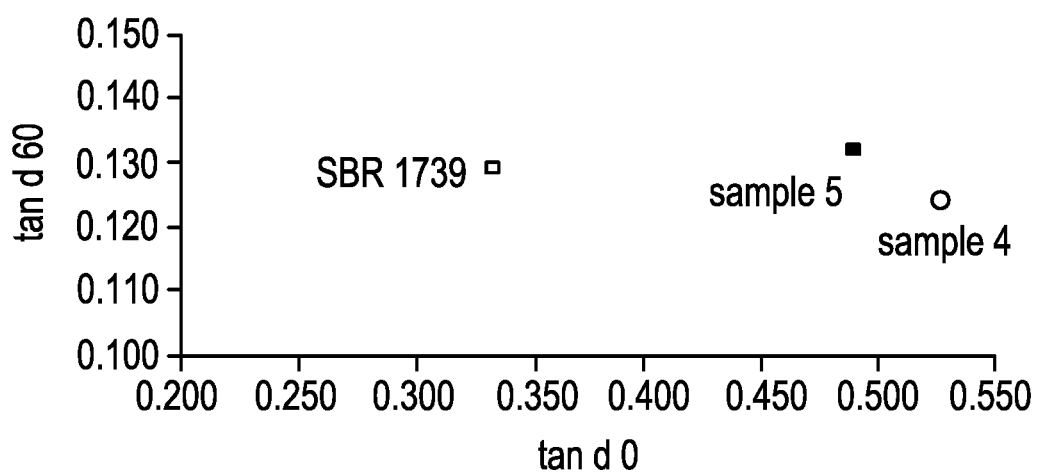
FIG. 4 is a plot depicting tan d 0 vs. tan d 60 of Examples 7 and 8 in comparison to Comparative Example 2.

FIG. 4 is a plot depicting tan delta 0 vs. tan delta 60 of Examples 4 and 5 (again called Sample 4 and 5) in comparison to Example 6 (called SBR 1739). Examples 4 and 5 show significant increases of tan delta 0° C. without sacrificing tan delta 60° C. compared to Example 6. This result is indicative of about 65% improvement for grip in Examples 4 and 5 over the related standard material.

All patents, test procedures, and other documents cited herein, including priority documents, are fully incorporated by reference to the extent such disclosure is not inconsistent with this invention and for all jurisdictions in which such incorporation is permitted.

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which the invention pertains.

When numerical lower limits and numerical upper limits are listed, ranges from any lower limit to any upper limit are contemplated.

In the description, all numbers disclosed are approximate values, regardless whether the word "about" or "approximate" is used in connection therewith. Depending upon the context in which such values are described herein, and unless specifically stated otherwise, such values may vary by 1 percent, 2 percent, 5 percent, or, sometimes, 10 to 20 percent. Whenever a numerical range with a lower limit, RL, and an upper limit, RU, is disclosed, any number falling within the range is specifically disclosed. In particular, the following numbers (R) within the range are specifically disclosed: R=RL+k*(RU−RL), wherein k is a variable ranging from 1 percent to 100 percent with a 1 percent increment, i.e., k is 1 percent or 2 percent or 3 percent to 99 percent or 100 percent. Moreover, any numerical range defined by two R numbers as defined above is also specifically disclosed.

As used herein and in the claims, the term "comprising" is inclusive or open-ended and does not exclude additional unrecited elements, compositional components, or method steps. Accordingly, such terms are intended to be synonymous with the words "has", "have", "having", "includes", "including", and any derivatives of these words.

What is claimed is:

1. A composition comprising a diene-based rubber and at least one cyclo-aliphatic epoxide-based polyether or polyglycol ether.

2. The composition of claim 1, wherein the diene-based rubber comprises a butadiene-based polymer.

3. The composition of claim 1, further comprising at least one rubber selected from the group consisting of a natural rubber, a butadiene-based rubber, an ethylene-propylene-diene monomer rubber, and an isoprene based rubber.

4. The composition of claim 1, further comprising a filler, wherein the filler is selected from the group consisting of carbon black, talc, silica, sulfur, zinc oxide, and mixtures thereof.

5. The composition of claim 1, further comprising a curing agent, wherein the curing agent is selected from the group consisting of sulfur, a mercaptan, a silane coupler, and mixtures thereof.

6. The composition of claim 5, wherein the curing agent further comprises an accelerant.

7. The composition of claim 1, wherein the at least one cyclo-aliphatic epoxide-based polyether or polyglycol ether is comprised of a reaction product between at least one cyclo-aliphatic epoxide and at least one reactant.

8. The composition of claim 7, wherein the cyclo-aliphatic epoxide has 4-12 carbon atoms.

9. The composition of claim 7, wherein the cyclo-aliphatic epoxide is selected from the group consisting of cyclobutene oxide, cyclopentene oxide, cyclohexene oxide, cycloheptene oxide, cyclooctene oxide, cyclododecene oxide, 1,2,5,6-diepoxycyclooctane, alkyl-substituted derivatives thereof, and mixtures thereof.

10. The composition of claim 7, wherein the reactant is a compound with at least one hydroxyl functional group.

11. The composition of claim 7, wherein the reactant is selected from the group consisting of water, primary aliphatic alcohols, secondary aliphatic alcohols, tertiary aliphatic alcohols, cycloalkyl alcohols, glycols, polyols, and mixtures thereof.

12. The composition of claim 1, further comprising at least one extending oil selected from the group consisting of an aromatic oil, an aliphatic oil, a naphthenic oil, and mixtures thereof.

13. The composition of claim 1, wherein the composition has a Mooney viscosity ($ML_{1+4}$ at 100° C.) of about 40 to about 70 Mooney units.

14. The composition of claim 1, wherein the diene-based rubber has a styrene content in the range of about 20 to about 40 weight percentage of said diene-based rubber.

15. The composition of claim 1, wherein the composition is cured.

16. The cured composition of claim 15, wherein the cured composition has a percentage of cross-linking in a range of about 50 to about 100 percent.

17. A method for producing said composition of claim 1, comprising a step of incorporating at least one of the cyclo-aliphatic epoxide-based polyether or polyglycol ether into the diene-based rubber.

18. The method according to claim 17, wherein the step of incorporating occurs through an emulsion-based polymerization process, a solution-based polymerization process, or a blending process.

19. A composition comprising a diene-based rubber and at least one extending oil, wherein the extending oil further comprises at least one cyclo-aliphatic epoxide-based polyether or polyglycol ether.

20. The composition of claim 19, wherein the at least one extending oil is in the range of about 0.1 to 50 percent by weight of the composition.

21. The composition of claim 19, wherein the at least one extending oil is selected from the group consisting of an aromatic oil, an aliphatic oil, a naphthenic oil, and mixtures thereof.

22. The composition of claim 19, wherein the at least one cyclo-aliphatic epoxide-based polyether or polyglycol ether content of the extending oil is in a range of about 0.1 to about 99 percent by weight of the at least one extending oil.

23. An article comprising the composition of claim 1.

24. The article of the claim 23, wherein the article is selected from the group consisting of tires, hoses, industrial rubber goods, and shoe soles.

25. The article of claim 23, wherein the article has a tan delta, measured at 0.2 rad/s and at a temperature of from about 0 to about 2° C., in the range of about 0.2 to about 0.4.

26. The article of claim 23, wherein the article has a tan delta, measured at 0.2 rad/s and at a temperature of about 60° C., in the range of about 0.08 to about 0.1.

27. A composition comprising at least one extending oil and at least one cyclo-aliphatic epoxide-based polyether or polyglycol ether, wherein the at least one extending oil is selected from the group consisting of an aromatic oil, an aliphatic oil, a naphthenic oil, and mixtures thereof, and wherein the at least one cyclo-aliphatic epoxide-based polyether or polyglycol ether is comprised of a reaction product between at least one cyclo-aliphatic epoxide and at least one compound with at least one hydroxyl functional group.

28. The composition of claim 27, wherein the at least one cyclo-aliphatic epoxide-based polyether or polyglycol ether content is in a range of about 0.1 to about 99 percent by weight of the composition.

29. The composition of claim 27, wherein the at least one extending oil is a treated distillate aromatic extract.

* * * * *